United States Patent
Sasaki et al.

(10) Patent No.: US 6,246,961 B1
(45) Date of Patent: Jun. 12, 2001

(54) COLLISION ALARM METHOD AND APPARATUS FOR VEHICLES

(75) Inventors: Kazuyuki Sasaki; Naoto Ishikawa, both of Numazu; Masato Nakajima; Hirosada Miyaoka, both of Tokyo, all of (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/327,573

(22) Filed: Jun. 8, 1999

(30) Foreign Application Priority Data

Jun. 9, 1998 (JP) .................................................. 10-160952

(51) Int. Cl.⁷ ...................................................... G06F 15/50
(52) U.S. Cl. .............................. 701/301; 701/28; 701/117
(58) Field of Search ..................................... 701/301, 117, 701/28; 356/1

(56) References Cited

U.S. PATENT DOCUMENTS 5,128,874 * 7/1992 Bhanu et al. ........................ 701/301
5,307,136 * 4/1994 Saneyoshi ................................ 356/1

FOREIGN PATENT DOCUMENTS 6-107096    4/1994 (JP).
7-50769     2/1995 (JP).

* cited by examiner

Primary Examiner—William A. Cuchlinski, Jr.
Assistant Examiner—Arthur D. Donnelly
(74) Attorney, Agent, or Firm—Armstrong, Westerman, Hattori, McLeland & Naughton

(57) ABSTRACT

A collision alarm method and apparatus for vehicles in which, in order to detect and alarm of danger of collision, the time of possible collision is calculated by a danger judgement means from optical flow. In order for an image processing means to detect the optical flow, a horizontal or vertical noticeable edge is used, which edge is extracted from two images obtained at different times with an image photographing means. The collision alarm method and apparatus for vehicles detect danger of collision at high speed and gives a timely alarm so as to enable collision avoiding action to be securely taken.

8 Claims, 5 Drawing Sheets

---

OBTAINING OF DIAGONAL REAR VIEW IMAGE

↓

DETECTION OF HORIZONTAL EDGE

↓

DETECTION OF OPTICAL FLOW

↓

CALCULATION OF COLLISION TIME FOR EACH EDGE

↓

JUDGING AND ALARMING OF DANGER

EDGE IMAGE

HORIZONTAL EDGE

THINNED HORIZONTAL EDGE

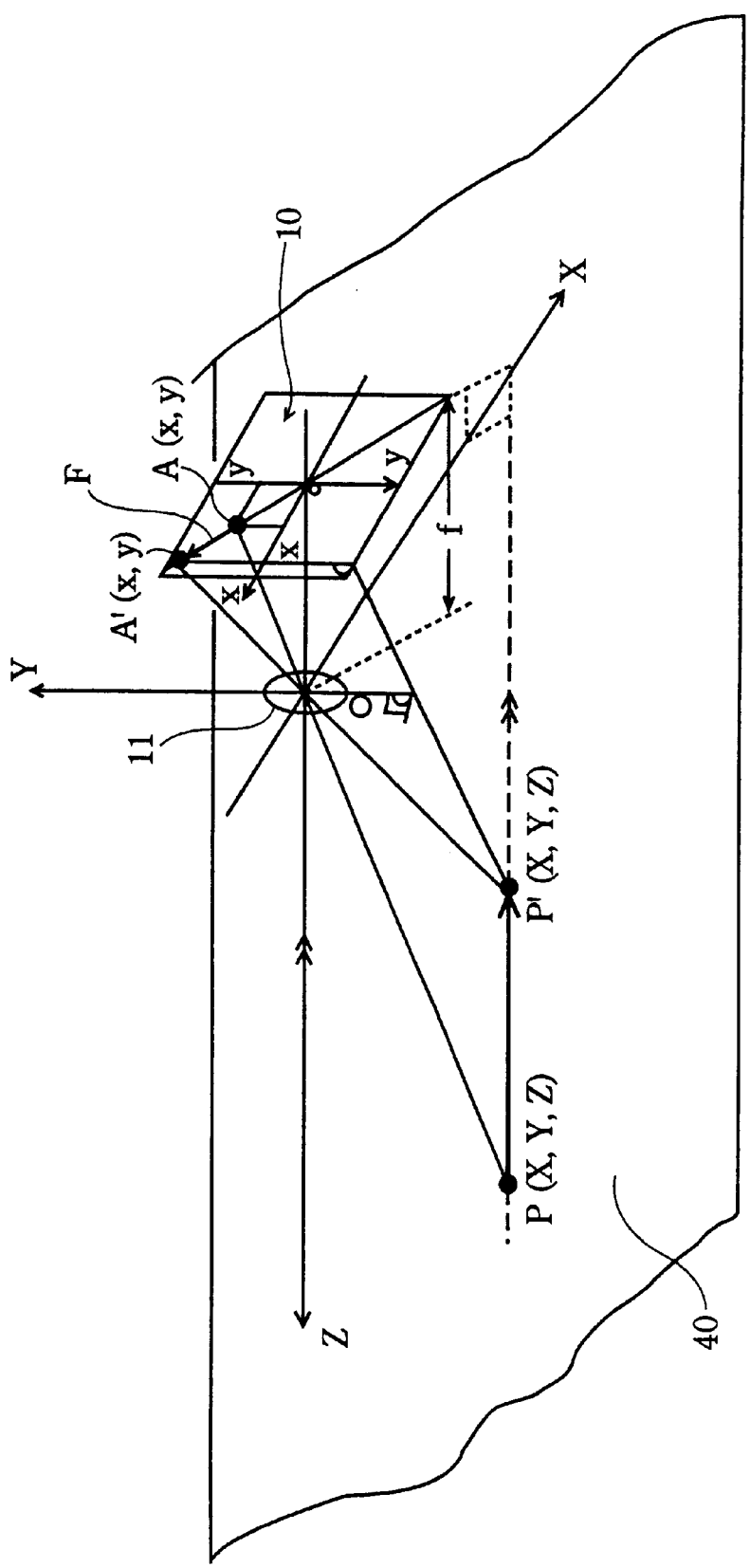

COLLISION ALARM METHOD AND APPARATUS FOR VEHICLES

BACKGROUND OF THE INVENTION

1. Field of the Invention

This invention relates to a collision alarm method and apparatus for vehicles, and more particularly, to a collision alarm method and apparatus for vehicles in which diagonally rearward photographs or forward photographs of a vehicle, such as an automobile, are taken with a photographing device such as a small, on-board CCD camera, and based on the images photographed the possibility of collision with another vehicle approaching from the diagonally rearward direction or traveling ahead is detected and alarmed to the driver by means of an alarm sound or the like.

2. Description of the Related Art

If, for example, during traveling on a superhighway the driver of a vehicle changes lanes without noticing another vehicle approaching in the adjoining lane to which he switches at a higher speed from the diagonally backward direction, a severe accident may be caused.

Further, if the driver of a vehicle suddenly brakes without noticing another vehicle approaching him from the backward direction in the same lane at a higher speed, it is likely that the another vehicle bumps into the rear of the driver's vehicle. It is thus necessary for the driver to notice vehicles around him. Likewise, if the driver of a vehicle swiftly approaches another vehicle traveling ahead of him and the another vehicle suddenly brakes, the driver may bump into the rear of the another vehicle. It is thus also necessary for the driver to recognize vehicles running ahead.

To cope with this problem, a method is proposed in Japanese Patent Applications Unexamined Publications Nos. 6-107096 and 7-50769 according to which optical flow is used to detect the approach to another vehicle running ahead and the approach of another vehicle from the diagonally backward direction and give an alarm in case of danger of collision.

In these conventional techniques, optical flow is obtained by processing two images obtained by photographing at different times the front view or the diagonal rear view of a vehicle with an on-board video camera, and by making use of a property of the optical flow, the degree of possibility of collision with another, approaching vehicle is judged. In other words, the property is used that the length of optical flow derived from the approaching vehicle becomes greater as the vehicle approaches at higher speed and the approaching vehicle comes closer to the vehicle with the on-board video camera. The approaching speed of and the distance to the approaching vehicle cannot be independently calculated from the optical flow.

In the above-mentioned conventional techniques, to obtain optical flow, as shown in FIG. 9, points A and B of variant brightness on the approaching vehicle in the two photographed images (A in the previously taken image and B in the later taken image) are selected as points to notice, and correlation windows WA and WB are set around the respective points A and B to process the pixels inside the correlation windows and extract the optical flow.

With the conventional techniques, however, there is a drawback in that the correlation window around the noticeable point cannot be made large in size if its processing time is taken into consideration, and if made with a size of 7 pixels×7 pixels, accuracy in detecting corresponding points in the two images photographed at different times will be lowered. Besides, if a large number of points of variant brightness exist on the approaching vehicle, the points to notice correspondingly increase, resulting in a longer time required for the processing.

Incidentally, it takes time before the driver, on being alarmed of a possible collision, takes action to correct his driving and avoid the collision. It is thus desirable that such an alarm be generated prior to the time required for completion of the action to avoid the possible collision.

SUMMARY OF THE INVENTION

This invention overcomes the above drawbacks and an object of this invention is to provide a collision alarm method and apparatus for vehicles which detect the danger of collision at high speed and give a timely alarm so as to enable action to be securely taken to avoid collision.

In order to attain the object, according to an aspect of this invention, there is provided a method of alarming of collision for vehicles, which comprises the steps of: photographing from a first vehicle to obtain two images of an environment at different times, the environment including a second vehicle; detecting in a previously-obtained one of the two images a first horizontal or vertical noticeable edge derived from the second vehicle; detecting in a subsequently-obtained one of the two images a second noticeable edge derived from the second vehicle, which corresponds to the first noticeable edge, with a correlation window set around the first and second noticeable edge; detecting an optical flow from the first and second noticeable edge; calculating a time of possible collision with the second vehicle based on the optical flow detected; and judging and alarming of danger of the possible collision with the second vehicle on the calculated time of the possible danger.

In the above collision alarm method, because the horizontal or vertical noticeable edge, which is extracted from two images taken at different times, is used to detect optical flow, the correlation window can be made large in size, and a reduction is made in the number of optical flows to be detected.

Advantageously, the two images are obtained by photographing a diagonal backward view of the first vehicle.

Owing to the above, danger of collision with the second vehicle approaching from the diagonal backward direction can be alarmed of based on the calculated time of possible collision.

Advantageously, the two images are obtained by photographing a forward view of the first vehicle.

Advantageously, the two images have a plurality of the corresponding noticeable edges derived from two or more of the second vehicles, and the step of calculating a time of possible collision comprises calculating the time of possible collision based on the optical flow detected from each of the corresponding noticeable edges derived from the second vehicles, and getting together the corresponding noticeable edges in groups according to the times of possible collisions, each of the groups of the corresponding noticeable edges being derived from one or another of the second vehicles, and the step of judging and alarming of danger comprises judging and alarming of the danger of the possible collision with the one or another of the second vehicles.

Owing to the above, a plurality of approaching vehicles can be separately detected, assuming that the noticeable edges having the same collision time are derived from the same vehicle, and an alarm of danger of collision can be made for each vehicle.

Advantageously, in the above the two images are obtained by photographing a diagonal backward view of the first vehicle.

Advantageously, the time interval for obtaining the two images is varied in compliance with a size of the first and second noticeable edge on the two images.

Advantageously, the two images have a plurality of the corresponding noticeable edges derived from two or more of the second vehicles, and the step of calculating a time of possible collision comprises getting together the corresponding noticeable edges in groups according to positions and components of a direction of y-coordinate of optical flows detected on the two images from the corresponding noticeable edges, each of the groups of the corresponding noticeable edges being derived from one or another of the second vehicles, and calculating the time of possible collision based on the optical flow or flows detected for each of the groups of the corresponding noticeable edges, and the step of judging and alarming of danger comprises judging and alarming of the danger of the possible collision with the one or another of the second vehicles.

According to another aspect of this invention, there is provided an apparatus for alarming of collision for vehicles, which comprises: photographing means for photographing from a first vehicle to obtain two images of an environment at different times, the environment including a second vehicle; image processing means for detecting in a previously-obtained one of the two images a first horizontal or vertical noticeable edge derived from the second vehicle, detecting in a subsequently-obtained one of the two images a second noticeable edge derived from the second vehicle, which corresponds to the first noticeable edge, with a correlation window set around the first and second noticeable edge, and detecting an optical flow from the first and second noticeable edge; and danger judgement means for calculating a time of possible collision with the second vehicle based on the optical flow detected by the image processing means, and judging and alarming of danger of the possible collision with the second vehicle on the calculated time of the possible danger.

The above and other objects, features and advantages of this invention will become apparent from the following description and the appended claims, taken in conjunction with the accompanying drawings.

BRIEF DESCRIPTION OF THE DRAWINGS

FIG. 4 is a view showing typically the coordinates of the feature points and optical flow on the image plane;

DESCRIPTION OF THE PREFERRED EMBODIMENTS

Figure 1:
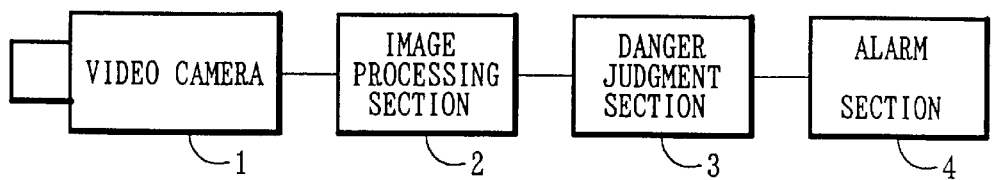
FIG. 1 is a view of one embodiment of a diagonal rear view monitoring apparatus for vehicles to which this invention has been applied.

Embodiments of this invention will now be described with reference to the attached drawings. FIG. 1 is a block diagram of a diagonal rear view monitoring apparatus for vehicles to which this invention has been applied. In this figure, denoted 1 is a video camera as an image obtaining means mounted at the rear of a vehicle and directed diagonally rearwardly, 2 is an image processing section into which images obtained with the video camera 1 are inputted and which performs later-described processing of these images, 3 is a danger judgement section which judges the danger of collision from the result of the image processing at the image processing section 2, and 4 is an alarm generating section which, based on the judgement result from the danger judgement section 3, alarms the driver of the danger. The alarm generating section 4, when the driver has operated a turn indicator light before changing lanes, detects the operation of the turn indicator light as an input and gives the driver a warning, if danger exists, by way of, for example, an alarm sound that changing lanes at that time is dangerous, thereby making it possible to prevent collision or hitting with another vehicle.

Figure 3A:
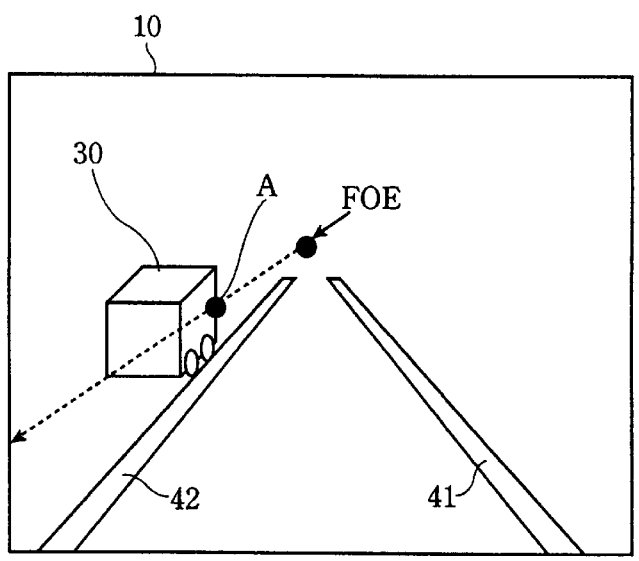
FIGS. 3A and 3B are views of two images obtained at different times with a video camera mounted, directed diagonally backwardly, at the rear of the one vehicle and displayed within the frame of an image plane of the video camera, with one example of extracted feature points and FOE shown.
Figure 3B:
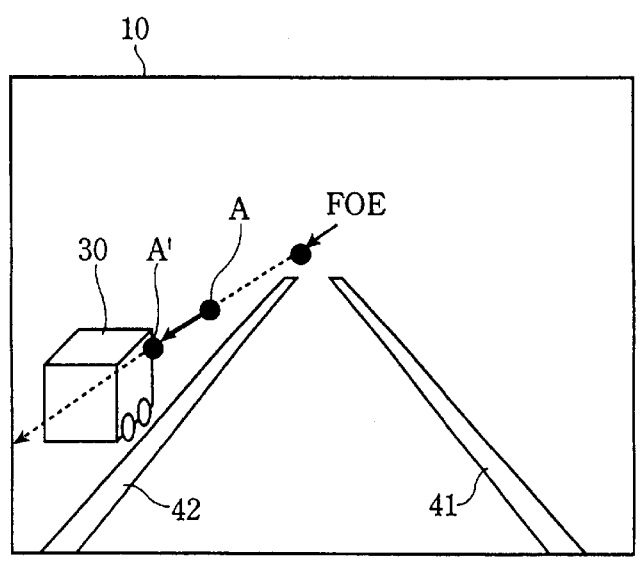
Figure 2:
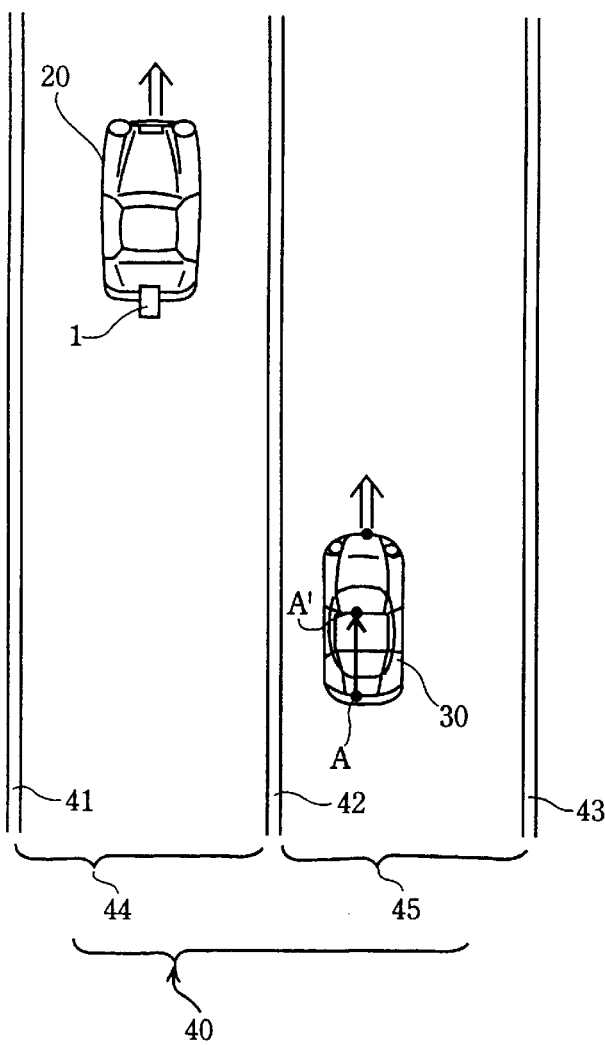
FIG. 2 is a view of one example in which one vehicle with the monitoring apparatus of FIG. 1 travels on a road along with another vehicle.

FIG. 2 shows a vehicle 20 with the video camera 1 (hereafter referred to as one vehicle) traveling in one lane and another vehicle 30 (hereafter referred to as the other vehicle) traveling in an adjoining lane at a higher speed to overtake and pass the one vehicle 20. In this figure, denoted 41 to 43 are white or yellow lines painted on the road 40 to divide the lanes. FIGS. 3A and 3B show diagonal rear view images in outline photographed with the video camera 1 in the condition of FIG. 2 and displayed within the frame of an image plane 10 inside the video camera 1, of which FIG. 3A is an image taken at the time of t−Δt, and FIG. 3B is an image taken at the time of t. Information on these images is stored in a not-shown frame memory inside the image processing section 2.

Points A, A' on the other vehicle 30 corresponding to each other in the two images taken at different times are detected and connected, so as to obtain a speed vector as shown in FIG. 3B, and this is optical flow. Incidentally, if the other vehicle 30 goes away, the direction of the vector becomes opposite.

The optical flow appears in a radial manner from one point in the image called FOE (Focus of Expansion), i.e., the infinitely remote point or disappearing point in the image. The FOE is located, in the moving condition of the one vehicle 20, at one point on the image in the direction opposite the traveling direction of the one vehicle. Thus, the optical flow obtained when the one vehicle 20 is traveling appears in the radial direction from the FOE, and the optical flow derived from the other vehicle 30 traveling in the same or adjoining lane contains information on the position, speed and the like of the other vehicle relative to the one vehicle 20, and is indicative of a higher degree of possibility of collision if it is elongated and emanates from the FOE.

Details of the above-mentioned optical flow will now be described with reference to FIG. 4 which is a view showing typically the relation between the points A, A' and an optical flow F on the image plane 10 and the points P, P' within the photographed area on the road 40. The corresponding relation between the points A, A' on the image plane 10 and the points P, P' within the photographed area also applies to the relation between points on the other vehicle 30 and their corresponding points as well as points of lane markers on the road 40 and their corresponding points.

In FIG. 4, denoted 11 is a lens system of the video camera 1, P(X,Y,Z) is a point on the other vehicle 30 at one time, P'(X,Y,Z) is a point corresponding to the point P on the other vehicle 30 at a later time by $\Delta t$ at which the next photograph is taken, A(x,y) is a point focused on the image plane 10 corresponding to the above point P, A'(x,y) is a point focused on the image plane 10 corresponding to the above point P', and f is a distance from the lens system 11 to the image plane 10.

For simplicity of explanation, in FIG. 4 the coordinate axis Z is set parallel to the traveling direction of the other vehicle 30, and the image plane 10 is arranged to perpendicularly intersect the coordinate axis Z.

When geometrically considered on FIG. 4, the following equations are obtained.

$$x = f \cdot X/Z \tag{1}$$

$$X' = \{(\Delta x/\Delta t) \cdot Z + x \cdot Z'\}/f \tag{2}$$

$$\text{Assuming that } = \Delta x/\Delta t \tag{3}$$

$$Z = (f \cdot X' - x Z')/u \tag{4}$$

Z' here is the relative speed between the other vehicle 30 running in the adjoining lane and the one vehicle 20, and thus assuming that $$Z' = -\alpha \tag{5}$$

the above equation (4) is $$Z = (f \cdot X' + x \cdot \alpha)/u \tag{6}$$

Accordingly, it is aquired that the component of x-direction of the optical flow F ($\Delta x/\Delta t = u$) is $$u = (f \cdot X' + x \cdot \alpha)/Z \tag{7}$$

and that the component of y-direction of the optical flow F ($\Delta y/\Delta t = v$) is $$v = (f \cdot Y' + y \cdot \alpha)/Z \tag{8}$$

Generally speaking, the other vehicle 30, as shown in FIG. 2, moves straight in the adjoining lane 45 to catch up the one vehicle 20. In other words, its direction of travel is substantially parallel to the Z-axis. The movement of the other vehicle 30 in the direction of X-axis or in the lateral direction, although possibly takes place when for example the other vehicle 30 switches to the leftside lane 44 or when traveling in a zigzag way for some reason, is at a fairly low speed as compared with that at which the normal travel in the direction of Z-axis is made. Thus, the component of the direction of X-axis of the optical flow F of the other vehicle 30 may substantially be ignored in cases. For example, if the other vehicle 30 travels in a lateral, rightward direction on FIG. 2, it means moving into a region of dead angle from the video camera 1 and thus in the direction of reducing the danger of collision against the one vehicle.

Accordingly, the initial value of the component of the X-axis direction of the speed vector or the speed in the lateral direction of the other vehicle 30 has not been estimated above. The component of the direction of X-axis may of course be estimated. Further, the movement of the direction of Y-axis (vertical direction) of the other vehicle 30 has not been considered, it requiring a further less consideration than the movement of the direction of X-axis of the other vehicle 30.

For the reasons above, the movement of the other vehicle 30 in the directions of X-axis and Y-axis may not be taken into account and may be omitted. Thus, by substituting 0 for X' and for Y' in the above equations of (7) and (8), $$u = x \cdot \alpha/Z \tag{9}$$

$$v = y \cdot \alpha/Z \tag{10}$$

are acquired. By summarizing these, $$Z/\Delta = x/u \tag{11}$$

$$Z/\Delta = y/v \tag{12}$$

are acquired which indicate the time of collision. In other words, $Z/\Delta$ is a value obtained by dividing the distance Z between the one vehicle and the other vehicle by the relative speed $\alpha$ and indicates the time up to the collision at which Z is 0. The time of collision is thus acquired.

To take the equation (12) for example, the time of collision is acquired by $Z/\alpha$ (Z: between-vehicles distance;s relative speed), and this is acquired from the optical flow originating y-coordinate and the magnitude v of the component of the direction of y-coordinate of the optical flow.

In the above, the speed vector which is obtained by detecing and connecting the corresponding points A, A' on the other vehicle 30 is described as the optical flow, and in this connection the processing at the image processing section 2 will now be concretely described.

When a diagonal rear view image obtained with the video camera 1 is image-processed at the image processing section 2, an edge image is obtained which has horizontal edges and vertical edges. By selecting such edges as a noticeable feature, a correspondence can be made between two images photographed at different times. Optical flow on the notable edges can thus be detected at the image processing section 2.

Figure 5A:
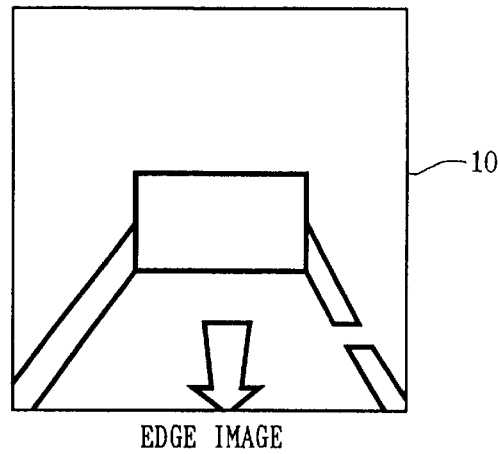
FIGS. 5A, 5B and 5C are views showing how noticeable edges are extracted as features from an edge image detected.
Figure 5B:
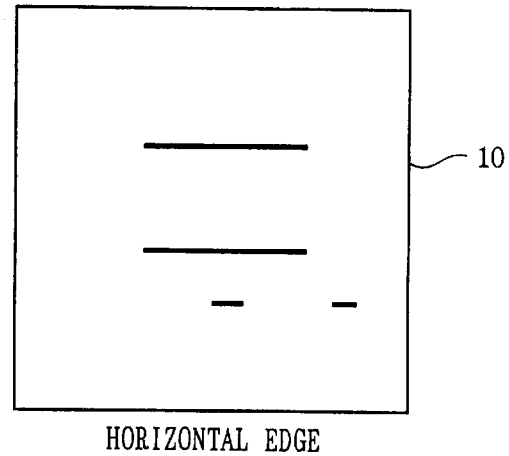
Figure 5C:
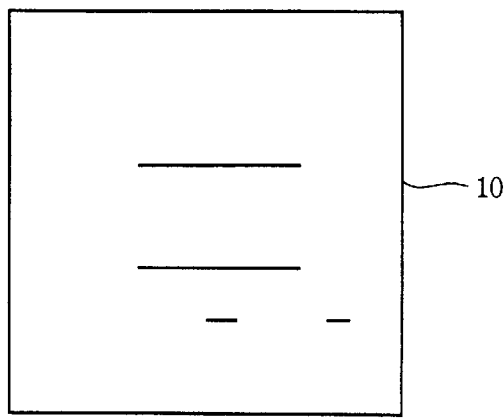

If for example an edge image as shown in FIG. 5A is obtained, points having the same y-coordinate values are extracted to provide continuous horizontal edges as noticeable edges as shown in FIG. 5B. These horizontal edges are thinned as shown in FIG. 5C by extracting for example only points of the same y-coordinate values at the edges closer to the one vehicle. Such a thinned horizontal edge is used as the noticeable edge.

The edge image of FIG. 5A can be obtained by utilizing a difference in brightness between the image of the other vehicle 30 and the-image of the remaining road, background and the like and accurately detecting the edges defining the boundaries between them. To detect the edges, with a view to improving the detection accuracy, an image processing technique such as edge emphasizing by differential processing as a pre-treatment, noise elimination by space filtering or the like may be used, and as a technique for boundary recognition, various polygonal approximation methods such as Freeman method, Sklansky method and distance division method.

Figure 6:
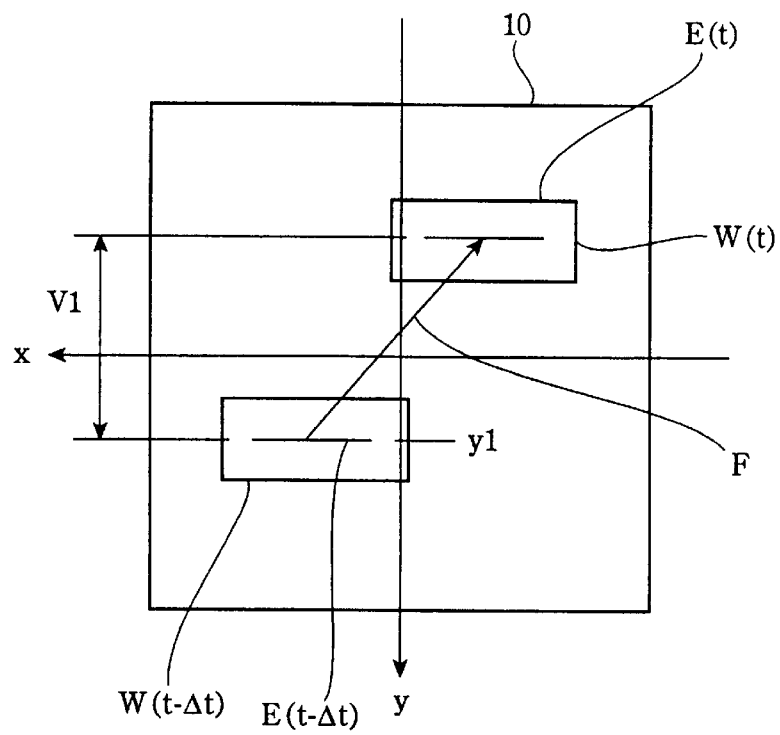
FIG. 6 is a view showing how optical flow is detected from the noticeable edges in the two images taken at different times.
Figure 9:
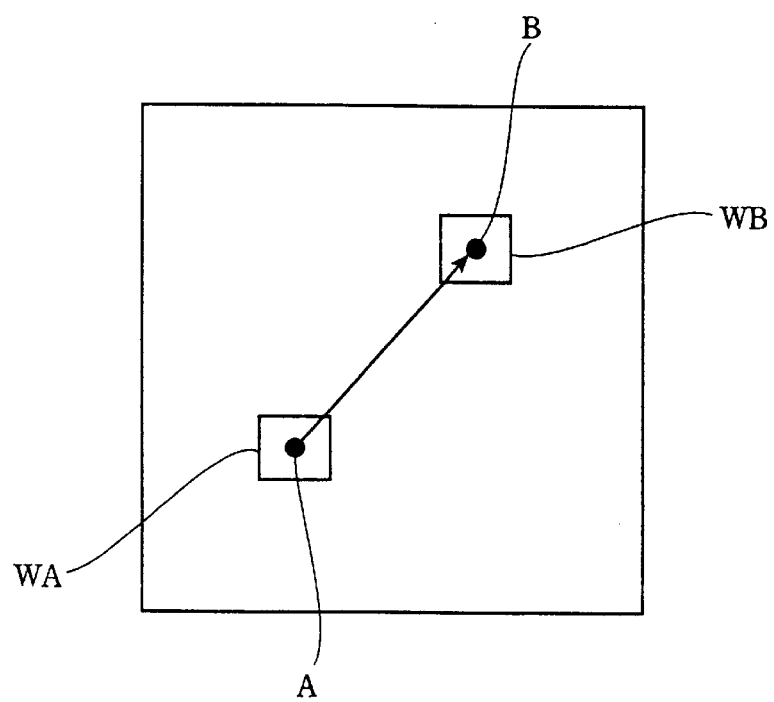
FIG. 9 is a view showing how optical flow is conventionally acquired.

Then, as shown in FIG. 6, a relatively large correlation window W ($t-\Delta t$) is set around a noticeable edge E ($t-\Delta t$) extracted in the previously obtained image, and the correlation window W ($t-\Delta t$) is used to detect the corresponding noticeable edge E (t) in the subsequently obtained image. The thinned-horizontal edges E (t−Δt), E (t) are thus detected which correspond to each other in the two images obtained at different times.

As shown, because the optical flow from every point in the thinned horizontal edge has, at the starting point, the same y-coordinate value and has the same movement in the y-direction (component of the direction of y-coordinate), one optical flow F can be detected between the corresponding thinned horizontal edges in the two images.

If the optical flow F is detected at the image processing section 2, the time of collision with the other vehicle approaching from the diagonal rear direction, from which the thinned horizontal edge (noticeable edge) is derived, can be calculated by the equation (12), i.e., by $Z/=y1/v1$, assuming that the above y-coordinate value of the noticeable edge in the previously obtained image is y1 and its movement in the y-direction is v1.

With such a noticeable edge used, the correlation window W(t−Δt), W(t) is made large as compared with the case where a point is used as a feature, leading to an improved accuracy in detecting a correspondence between two images taken at different times. Further, in the case of an edge, because of a smaller number of comparable features as compared with the case of a point, a reduction can advantageously be made in the processing time for the optical flow F at the image processing section 2.

Figure 7:
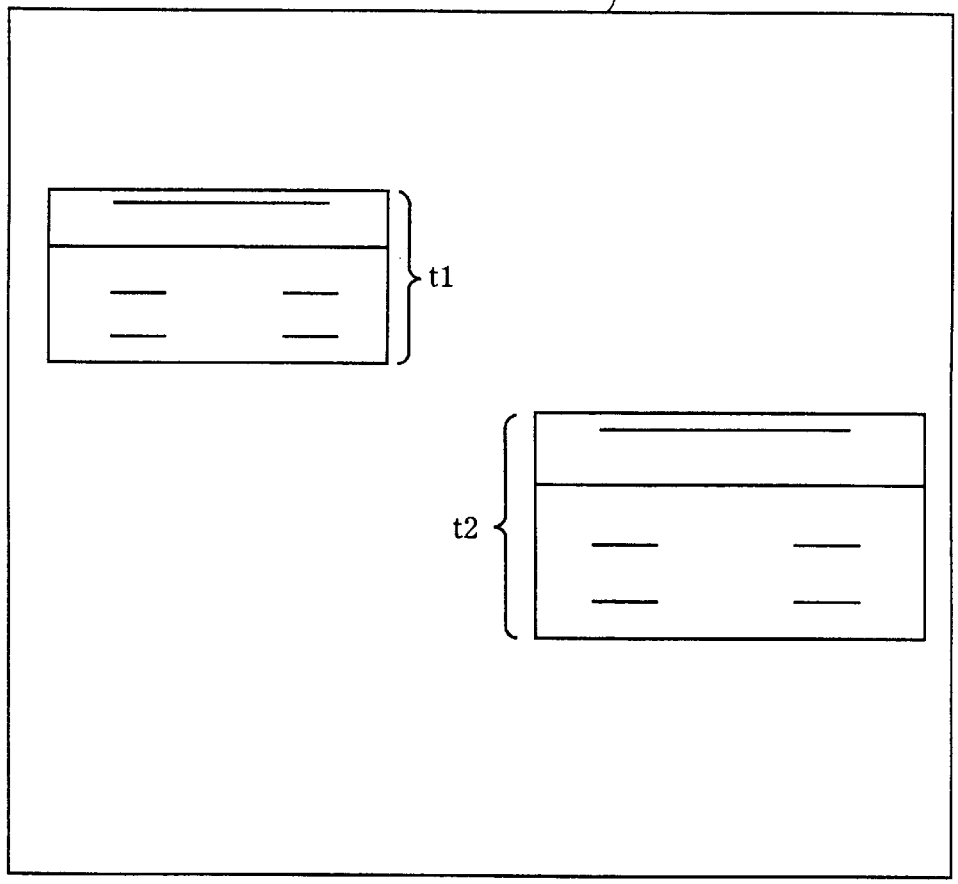
FIG. 7 is a view showing how to process to separately detect a plurality of approaching vehicles according to times of collision.

If the calculation of the collision time at the danger judgement section 3 is effected for each horizontal edge, horizontal edges of different collision times will be obtained. It is assumed that the edges having the same collision time are derived from the same vehicle. By getting the edges together in groups T1, t2 (t1>t2) according to their collision times as shown in FIG. 7, image areas each resulting from the same vehicle can be extracted in the image. By thus extracting the image area for each vehicle, where there are a plurality of approaching vehicles, they can be separately detected, making it possible to give an alarm based on a more reliable-judgement on an approaching vehicle or vehicles.

In the above, it is also possible to first gather the corresponding noticeable edges in groups according to positions and components of a direction of y- or x-coordinate of optical flows detected from the corresponding noticeable edges, each of the groups of the corresponding noticeable edges being derived from one or another of the approaching vehicles, and calculating the time of possible collision based on optical flow detected for each of said groups of the corresponding noticeable edges derived from the approaching vehicles.

In this way, because the calculation of the time of possible collision can be effected per group of the noticeable edges, the time required for the image processing will be further shortened.

The danger judgement section 3 has a predetermined judgement value for judging the danger of collision with the other approaching vehicle based on the collision time calculated from the optical flow. As the judgement value, a different one is set depending on, for example, the acceleration performance of the one vehicle. This is because, although subject to the purpose for which to give the alarm, if it is intended for example to alarm the driver of the danger at the time of switching lanes, the acceleration performance needs to be taken into account in deciding the judgement value.

The length of a noticeable edge is generally small when the approaching vehicle is still remote and becomes larger as it comes closer. Thus, by using this feature of the edge length, the time interval between the two images can be shortened when the edge length is large and the approaching vehicle is close, and lengthened when the edge length is small and the approaching vehicle is still remote, thereby enabling a timely alarming of the approaching vehicle.

In other words, by shortening the time interval between the two images when the ledge length is large and the approaching vehicle is close, an alarm can be given without delay. On the contrary, because there is enough time in case the edge length is small and the approaching vehicle is still remote, by lengthening the time interval between the two images and obtaining optical flow with a large vector length, a more accurately worked-out collision time can be acquired.

While the above description concerns the horizontal edge, it is naturally also possible to process a vertical edge as a noticeable edge. In this case, although the calculating method to the collision time based on the noticeable edge changes, the remaining processing based on the calculated collision time can be done in the same manner. In other words, also in the case of a vertical edge, because the optical flow from every point in the thinned vertical edge has, at the starting point, the same x-coordinate value and has the same movement in the x-direction (component of the direction of x-axis), the collision time can be calculated by $Z/\alpha=x1/u1$, assuming that the x-coordinate value is x1 and the movement in the x-direction is u1.

Figure 8:
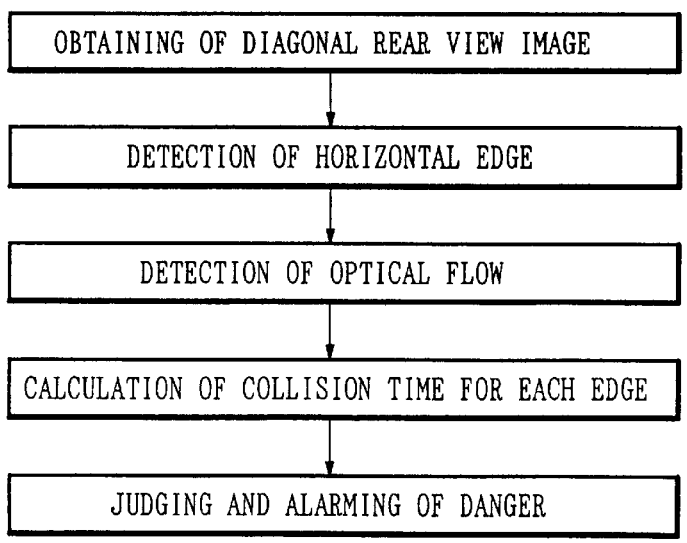
FIG. 8 is a flow chart showing in brief the procedure of the image processing and danger judgement according to this invention.

The above-described procedure of the image processing and danger judgement according to this invention may be summarized as shown in FIG. 8. First, two images obtained by photographing the diagonal rear environment of the one vehicle at different times with the video camera 1 are each stored in a not-shown frame memory. Corresponding horizontal edges in the respective images are then detected with a correlation window. In other words, a correlation window is set for a noticeable horizontal edge in the previously obtained image, and the correlation window is used to detect the corresponding noticeable edge in the subsequently-obtained image. Optical flow is then detected from the horizontal edges. After optical flow has been detected, the time of collision is calculated from each optical flow. The danger of collision with the other vehicle, which approaches from the diagonal rear direction, is judged based on the calculated time of collision and an alarm is given based on the result.

While in the above example the video camera 1 is mounted, directed diagonally rearwardly, at the rear of the one vehicle and it is intended to detect and alarm of the danger of collision with the other vehicle 30 which overtakes and passes the one vehicle 20, traveling in one of the lanes adjoining the lane where the one vehicle 20 is travelling, it is also possible to mount the video camera 1, directed forwardly, at the front of the one vehicle 20 and detect and alarm of the danger of collision with other vehicle or obstacle in front to which the one vehicle is approaching, by calculating the time of collision from the optical flow obtained from the noticeable edges in the manner as described above.

As described hereinabove, according to this invention, in order to detect optical flow for calculating the time of collision and subsequent judging and alarming of the danger of collision, a horizontal or vertical noticeable edge is used which is detected in the two images photographed at different times. As a result, the correlation window can be made large, thereby leading to an improved accuracy in detecting a correspondence between the two images photographed at different times. Further, because a reduction is made in the number of optical flows to be detected, a shortened period of time is needed for image processing. Accordingly, the danger of collision can be detected at high speed and timely alarmed of, reliably making it possible for the drive. to take action to avoid a possible collision.

Having now fully described the invention, it will be apparent to one of ordinary skill in the art that many changes and modifications can be made thereto without departing from the spirit and scope of the invention as set forth herein.

What is claimed is:

1. A method of alarming of collision for vehicles comprising the steps of:

photographing from a first vehicle with a photographing means fixedly oriented in a predetermined direction to obtain two images of an environment at different times, said environment including a second vehicle;

detecting in a previously-obtained one of said two images a first horizontal or vertical noticeable edge derived from said second vehicle;

detecting in a subsequently-obtained one of said two images a second noticeable edge derived from said second vehicle, which corresponds to said first noticeable edge, with a correlation window set around said first and second noticeable edge;

detecting an optical flow from said first and second noticeable edge;

calculating a time of possible collision with said second vehicle based on said optical flow detected; and judging and alarming of danger of said possible collision with said second vehicle on said calculated time of said possible danger.

2. The method according to claim 1, wherein said two images are obtained by photographing with said photographing means fixedly oriented so as to provide a diagonal backward view of said first vehicle.

3. The method according to claim 1, wherein said two images are obtained by photographing with said photographing means fixedly oriented so as to provide a forward view of said first vehicle.

4. The method according to claim 1, wherein said two images have a plurality of said corresponding noticeable edges derived from two or more said second vehicles, and said step of calculating a time of possible collision comprises calculating said time of possible collision based on said optical flow detected from each of said corresponding noticeable edges derived from said second vehicles, and gathering said corresponding noticeable edges in groups according to said times of possible collisions, each of said groups of said corresponding noticeable edges being derived from one or another of said second vehicles, and said step of judging and alarming of danger comprises judging and alarming of said danger of said possible collision with said one or another of said second vehicles.

5. The method according to claim 4, wherein said two images are obtained by photographing with said photographing means fixedly oriented so as to provide a diagonal backward view of said first vehicle.

6. The method according to claim 1, wherein a time interval for obtaining said two images is varied in compliance with a size of said first and second noticeable edge on said two images.

7. The method according to claim 1, wherein said two images have a plurality of said corresponding noticeable edges derived from two or more said second vehicles, and said step of calculating a time of possible collision comprises gathering said corresponding noticeable edges in groups according to positions and components of a direction of y- or x-coordinate of optical flows detected on said two images from said corresponding noticeable edges, each of said groups of said corresponding noticeable edges being derived from one or another of said second vehicles, and calculating said time of possible collision based on said optical flow or flows detected from each of said groups of said corresponding noticeable edges, and said step of judging and alarming of danger comprises judging and alarming of said danger of said possible collision with said one or another of said second vehicles.

8. An apparatus for alarming of collision for vehicles comprising:

photographing means fixedly oriented in a predetermined direction on a first vehicle for photographing to obtain two images of an environment at different times, said environment including a second vehicle;

image processing means for detecting in a previously-obtained one of said two images a first horizontal or vertical noticeable edge derived from said second vehicle, detecting in a subsequently-obtained one of said two images a second noticeable edge derived from said second vehicle, which corresponds to said first noticeable edge, with a correlation window set around said first an second noticeable edge, and detecting an optical flow from said first and second noticeable edge; and danger judgement means for calculating a time of possible collision with said second vehicle based on said optical flow detected by said image processing means, and judging and alarming of danger of said possible collision with said second vehicle on said calculated time of said possible danger.

* * * * *